Nov. 13, 1951  A. CASTAGNA  2,574,530
VARIABLE-SPEED TRANSMISSION
Filed Dec. 16, 1949
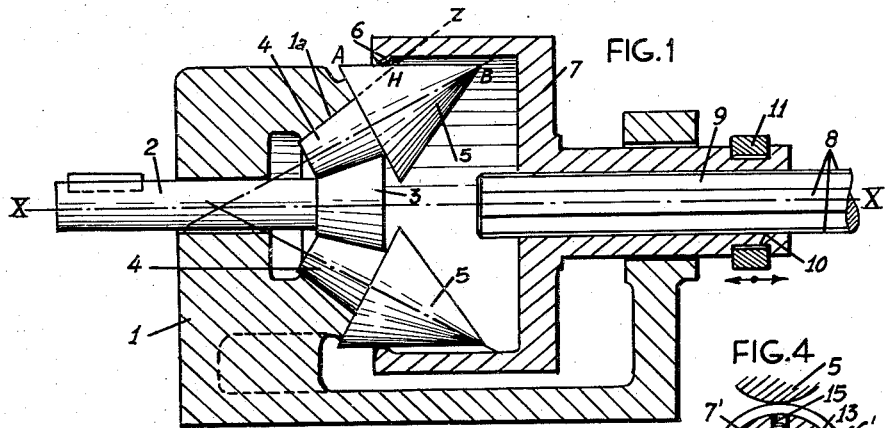
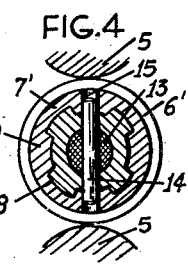
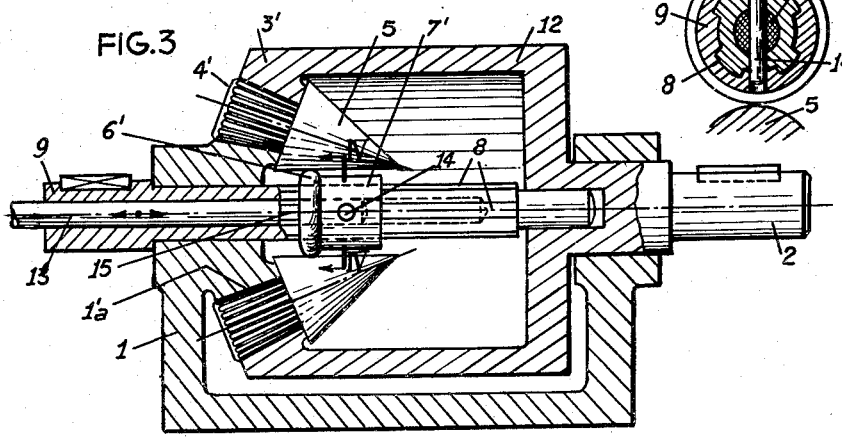
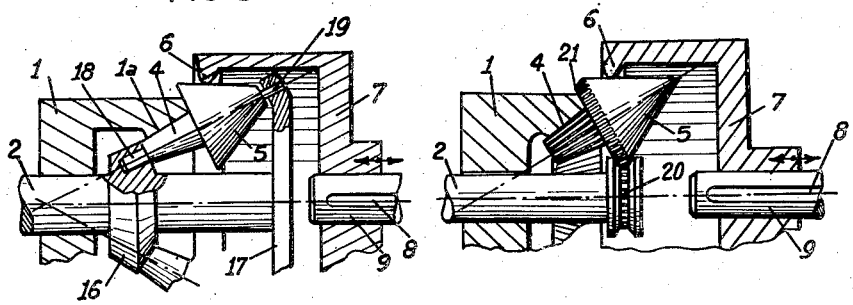
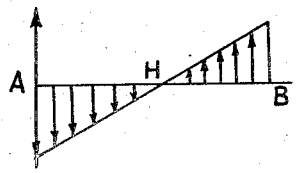
INVENTOR
ARNALDO CASTAGNA
BY
ATTORNEY Patented Nov. 13, 1951

2,574,530

UNITED STATES PATENT OFFICE 2,574,530

VARIABLE-SPEED TRANSMISSION

Arnaldo Castagna, Turin, Italy

Application December 16, 1949, Serial No. 133,265
In Italy December 17, 1948

2 Claims. (Cl. 74—796)

This invention relates to mechanisms for transmitting rotary motion between a driving and a driven shaft, more particularly to mechanisms adapted to effect a continuous variation in transmission ratio between said driving and driven shafts.

A first object of this invention is to provide a mechanism of the type referred to above, in which the variation in transmission ratio is obtained by axial displacement along the common axis of the driving and driven shafts of a member slidably keyed on one of said shafts.

A further object of this invention is to provide a variable speed transmission in which a continuous variation in either direction of rotation is obtained by displacing said slidable member in either direction about a point of contact thereof with a member formed by conical coaxial elements and serving as an intermediate power transmitter, said point of contact having a nil speed, inasmuch as it is situated on the axis of instantaneous rotation of said intermediate member.

These and further objects of this invention will appear from the appended specification, in which reference is made to the accompanying drawing, wherein:

Figure 1 is an axial section of a first embodiment of this invention,

Figure 2 is a speed diagram,

Figure 3 is an axial section of a further embodiment,

Figure 4 is a cross section on line IV—IV of Figure 3, and

Figures 5, 6 are two part axial sections of two further embodiments.

Referring to Figure 1 of the drawing, I denotes a supporting frame having rotatably mounted thereon a driving shaft 2 ending in a conical portion 3. The shaft portion 3 transmits movement by friction to a set of conical members 4 rolling by friction on a conical surface I on the stationary supporting frame I. Each conical member 4 is formed with an oppositely conical portion 5 having a generatrix parallel to the axis of the shaft 2. This generatrix of the conical elements 5 cooperates by friction with an annular bead 6 of a member 7 slidably keyed in grooves 8 in the driven shaft 9. This slidable member 7 is rotatably supported in the frame I and is formed with a groove 10 engaging a fork-shaped member 11 controlled by means of a lever or other known device in order to axially displace the slidable member 7 along the common axis x—x of the driving and driven shafts 2, 9, respectively.

Z denotes the axis of instantaneous rotation of one of the conical members 4, which cuts the generatrix of the conical member 5 on which bears the annular bead 6 at a point H of which the speed is therefore nil. Consequently, when contact between the members 6 and 5 takes place at the point H, motion is not transmitted.

By axially displacing the member 6 from the point H toward the ends A or B of member 5, contact takes place at points of which the speed are opposed and increase with the distance from said point. The rule of the speed variation is clearly visible from the diagram shown in Figure 2, in which the abscissae show the positions of the member 6 on the generatrix of the member 5 and the ordinates are the speeds.

In the modification shown in Figure 3, the driving shaft is fixedly connected with a cup-shaped member 12 ending by an internal conical surface 3' having an internal set of teeth engaging the conical member 4' meshing in turn with a set of teeth on an external conical surface 1a on the stationary frame 1. Each conical member 4' is integral with a further conical member 5, contacting with an annulus 6' fixedly connected with a sleeve 7' slidably keyed in the grooves 8 in the driving shaft 9. The axial displacement of the annulus 6' for obtaining the variation in speed and reversing the direction of rotation is obtained by means of a rod 13 axially displaceable in the hollow shaft 9 and connected with the sleeve 7' by means of a pin 14 extending through opposed slots 15 in the shaft 9.

The embodiment shown in Figure 5 differs from Figure 1 in that the bi-conical member 4, 5 is supported by a cage consisting of two discs 16, 17 fixedly connected with the driving shaft 2 and provided with supports in which end pins 18 and 19 of the bi-conical member are freely rotatable.

In the modification shown in Figure 6, an intermediate conical member 21 is interposed between the two conical members 4, 5 and is provided with a set of teeth which mesh with a bevel gear 20 on the shaft 2. The conical member 4 is toothed and meshes with an associated set of teeth on the conical surface carried by the stationary frame 1.

It will be clear from the examples described above that the functions of the driving, driven and stationary members, respectively, are interchangeable, this affording six manners of operations of each variable speed transmission. Of course, interchange of the functions produces a variation in the speed diagram.

What I claim is:

1. In a variable speed transmission, a stationary frame, a first shaft and a second shaft rotatably disposed in said frame in co-axial relationship, one of said shafts being a drving shaft and the other of said shafts being a driven shaft, a slidable member slidably keyed on said first shaft, a cup-shaped extension on said second shaft, and a set of conical elements each comprising two coaxial conical portions of different conicity, one of said portions of each element being simultaneously in contact with said stationary frame and said shaft extension, the other of said portions of each element being in frictional contact with said slidable member along a surface parallel to the axis of the shafts, the conical portion in contact with the stationary frame and the shaft extension being provided with teeth in meshing engagement with toothed portions on said frame and said extension, and means for axially displacing said slidable member.

2. In a variable speed transmission, a stationary frame, a first shaft having an internal bore and axial slots communicating with said bore, a second shaft, said first shaft and said second shaft being rotatably disposed in said frame in co-axial relationship, one of said shafts being a driving shaft and the other of said shafts being a driven shaft, a slidable sleeve member slidably keyed on said first shaft, a cup-shaped extension on said second shaft, and a set of conical elements each comprising two coaxial conical portions of different conicity, one of said portions of each element being simultaneously in contact with said stationary frame and said shaft extension, the other of said portions of each element being in frictional contact with said slidable member along a surface parallel to the axis of the shafts, the conical portion in contact with the stationary frame and the shaft extension being provided with teeth in meshing engagement with toothed portions on said frame and said extension, and means for axially displacing said slidable member, said means comprising a rod extending through the bore of said first shaft and connected to said slidable sleeve member through said slots.

ARNALDO CASTAGNA.

REFERENCES CITED

The following references are of record in the file of this patent:

UNITED STATES PATENTS

| Number | Name | Date |
| --- | --- | --- |
| 2,342,071 | Bade | Feb. 5, 1944 |
| 2,403,627 | Bade | July 9, 1946 |

FOREIGN PATENTS

| Number | Country | Date |
| --- | --- | --- |
| 405,647 | Great Britain | Feb. 5, 1934 |